United States Patent
Cai et al.

(10) Patent No.: US 10,150,879 B2
(45) Date of Patent: Dec. 11, 2018

(54) METHOD OF MAKING NIR-TO-VISIBLE UPCONVERSION INKJET INKS

(71) Applicant: TROY GROUP, INC., Costa Mesa, CA (US)

(72) Inventors: Xiaorong Cai, Mount Pleasant, SC (US); Michael R. Riley, Steubenville, OH (US)

(73) Assignee: TROY GROUP, INC., Costa Mesa, CA (US)

( * ) Notice: Subject to any disclaimer, the term of this patent is extended or adjusted under 35 U.S.C. 154(b) by 0 days.

(21) Appl. No.: 15/605,523

(22) Filed: May 25, 2017

(65) Prior Publication Data

US 2017/0260408 A1   Sep. 14, 2017

Related U.S. Application Data

(62) Division of application No. 14/978,530, filed on Dec. 22, 2015.

(60) Provisional application No. 62/163,237, filed on May 18, 2015.

(51) Int. Cl.
  *C09D 11/322* (2014.01)
  *C09D 11/38* (2014.01)
  *B41M 3/14* (2006.01)

(52) U.S. Cl.
  CPC ............ *C09D 11/322* (2013.01); *C09D 11/38* (2013.01); *B41M 3/144* (2013.01)

(58) Field of Classification Search
  CPC .............................. C09D 11/322; C09D 11/38
  USPC ....................................................... 524/104
  See application file for complete search history.

(56) References Cited

U.S. PATENT DOCUMENTS

| | | | |
|---|---|---|---|
| 5,207,825 A | 5/1993 | Schwarz, Jr. | |
| 2003/0105186 A1* | 6/2003 | Suthar | C08K 5/053 523/160 |
| 2005/0266908 A1 | 12/2005 | Hattori et al. | |
| 2007/0043144 A1* | 2/2007 | House | C09D 11/322 523/160 |
| 2008/0165235 A1 | 7/2008 | Rolley et al. | |
| 2014/0261031 A1* | 9/2014 | Kellar | B41F 17/00 101/211 |

OTHER PUBLICATIONS

Becky Shemanski and Stephen Miranda, Nano Sizing Via Wet or Dry Grinding, Powder Bulk SOlids, May 2010.*
Tyler Blumenthal et al., "Patterned direct-write and screen-printing of NIR-to-visible upconverting inks for security applications", IOP Publishing—Nanotechnology, vol. 23 Issue 18; May 11, 2012, 9 pages.
Briana Laubacker et al., "Synthesis of water-soluble lanthanide-doped upconversion nanoparticles for security printing application", University of South Dakota Center for Security Printing & Anti-Counterfeiting Technology (2013), 20 pages.
Won Jin Kim et al., "Color-coded multilayer photopatterned microstructures using lanthanide (III) ion co-doped NaYF$_4$ nanoparticles with upconversion luminescence for possible applications in security", IOP Publishing Nanotechnology, vol. 20 Issue 19, May 6, 2009, 8 pages.
IJ.M. Meruga et al., "Security Printing of Convert Quick Response Codes using Upconverting Nanoparticle Inks", Nanotechnology 23, 2012, 10 pages.

* cited by examiner

Primary Examiner — Deve E Valdez

(57) ABSTRACT

An upconverting pigment dispersion includes an upconverting pigment, such as a β-NaYF$_4$ crystal doped with at least one of Erbium, Ytterbium or Thulium. The upconverting pigment dispersion is aqueous. Upconverting inkjet ink is made by mixing the crystals with a polymer dispersant and water and milling the mixture until the crystal particles are between 50 nanometers and 200 nanometers. Deionized water, a colorant and a humectant are added to the milled mixture.

4 Claims, 2 Drawing Sheets

METHOD OF MAKING NIR-TO-VISIBLE UPCONVERSION INKJET INKS

CROSS REFERENCE TO RELATED APPLICATION

This application is a division of U.S. application Ser. No. 14/978,530 Dec. 22, 2015 for "Composition and Method of Making Nir-to-Visible Upconversion Inkjet Inks", which claims the benefit and priority of U.S. provisional patent application Ser. No. 62/163,237 filed on May 18, 2015 titled "Method for Processing NIR-to-Visible Upconversion Ink Jet Inks" which is incorporated in this application as if fully set forth herein.

BACKGROUND OF THE INVENTION

1. Field of the Invention

The present invention relates to methods for making inks that upconvert infrared light to visible light and that can be printed using inkjet printers.

2. Description of Related Art

Inks and toners that fluoresce when illuminated with ultraviolet light are well known and have been used for many years. These ultraviolet inks are downconverting because they emit light having a wavelength that is greater than the wavelength of the ultraviolet light. That is, the frequency of the emitted light is less than the frequency of the ultraviolet light. For example, an ultraviolet ink may fluoresce at a wavelength of about 500 nanometers (nm, corresponding to a frequency of 600 terahertz (THz), which is in the visible light spectrum) when illuminated by light having a wavelength of about 200 nm (1,500 THz, which is in the ultraviolet spectrum).

Downconverting/ultraviolet inks are used in document security. For example, a security image may be printed onto a document, such as a check, using ultraviolet ink. Because ultraviolet inks are colorless when illuminated by visible light, a counterfeiter may not observe the image and, thus, produce a counterfeit document that does not have the security image in ultraviolet ink. Because ultraviolet inks have been used in document security for years, counterfeiters are now aware of their existence and will illuminate documents using ultraviolet light to determine if an ultraviolet security image is part of the document.

Once a counterfeiter is aware of an ultraviolet security image, replication of the ultraviolet image is relatively easy. Ultraviolet inks are readily available. Ultraviolet inks for use with inkjet printers are also available. Printing using ultraviolet ink on a home use printer is now a relatively simple task.

In order to provide security features that include fluorescing, the inventors have been experimenting with upconverting inks and toners. As opposed to downconverting inks, upconverting inks convert light in the infrared spectrum to light in the visible spectrum. For example, these upconverting inks may fluoresce at a wavelength of about 500 nm (600 THz, which is in the visible light spectrum) when illuminated by light having a wavelength of about 900 nm (331 THz, which is in the infrared spectrum).

Upconverting infrared-responsive inks provide advantages over ultraviolet inks. Infrared-responsive security features are not widely used. The large infrared light source currently required to illuminate a significant portion of an upconverting image makes their use undesirable.

Attempts at making aqueous based upconverting inks have resulted in inks that cannot be used in an inkjet printer. For example, Kellar et al. (U.S. Pat. Pub. No. 2014/0261031) forms an ink by synthesizing and doping upconverting nanocrystals. Kellar et al. then disperses the upconverting nanocrystals into a solvent system. However, they were not able to disperse the upconverting nanocrystal particles into a water based system. The challenge of maintaining upconverting nanoparticles suspended or dispersed in a water based system remains. The ink of Kellar et al. is also expensive due to the cost of the raw material and the processes for synthesizing the upconverting nanocrystals.

Accordingly, there is a need for a relatively inexpensive and stable aqueous-based upconverting ink that is usable in inkjet printers.

SUMMARY OF THE INVENTION

An aqueous upconverting pigment dispersion according to the present invention can be used in formation of an inkjet ink. The upconverting nature of the dispersion causes the inkjet ink to upconvert infrared light to visible light. The aqueous upconverting pigment dispersion includes an upconverting pigment, such as a $\beta$-$NaYF_4$ crystal doped with at least one of Erbium, Ytterbium or Thulium. The dispersion also includes a dispersant and water. The upconverting pigment is a water-insoluble power and needs to be dispersed in the aqueous system in order to be used for inkjet printing. However, the selected dispersant used increases the stability of the upconverting pigment particles in the water based system.

After formation of the dispersion, additional ingredients are preferably admixed to the dispersion to form the ink. For example, humectants, surfactants and other additives may be admixed to the aqueous pigment dispersion.

The inkjet ink preferably is made by first making the upconverting pigment dispersion. In order to make the dispersion, the upconverting pigment, dispersant and water are pre-mixed. The mixture is then milled using a wet media mill to until a desired particle size is recorded to form a stable water based pigment dispersion. Particle size may be periodically measured during the milling process until desired particle size is reached. The humectants, surfactants and other additives are then admixed to the dispersion to form the upconverting inkjet ink.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
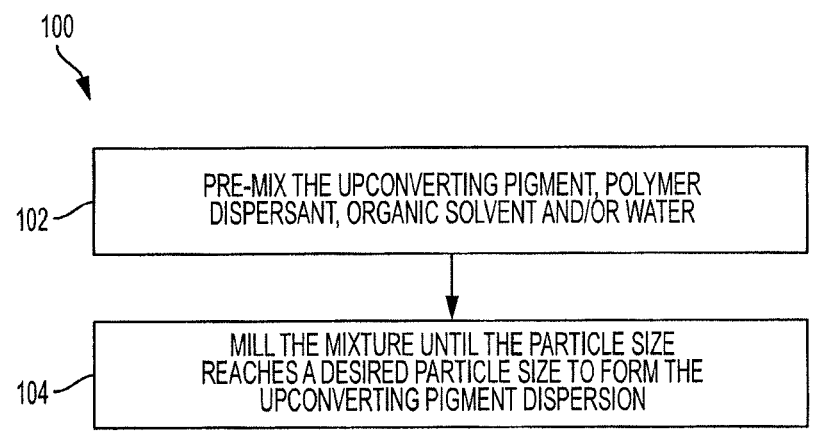
FIG. 1 is a block diagram illustrating a preferred method for making an upconverting pigment dispersion.

The inventors discovered how to make a relatively inexpensive and stable aqueous-based upconverting, or infrared-responsive, ink that can be used in an inkjet printer. The upconverting ink is based on an upconverting pigment dispersion that includes an upconverting pigment powder and a dispersant. The specific formula used in the upconverting pigment dispersion allows the upconverting pigment particles to remain stable in an aqueous solution.

The upconverting pigment dispersion may include an upconverting pigment, a dispersant, water, a deformer and/or a solvent. The ingredients of the upconverting pigment dispersion are milled to reduce the particle size. During this milling process, the dispersant attaches to the surface of the pigment particles. The inventors have discovered that this attachment action of the dispersant to the pigment particles increases the stability of the pigment particles suspended in water, thus making their use in an aqueous inkjet ink possible. The specific dispersants used and the ratio of pigment particles used enhance the stability of the pigment particles.

The upconverting pigment particles provide upconversion of light energy. The upconverting pigment particles upconvert infrared light to visible light. The particles fluoresce when illuminated by infrared light. Preferred materials for the upconverting pigment particles include β-NaYF$_4$ crystals which may be doped with one or more of Erbium (Er), Ytterbium (Yb) or Thulium (Tm). Exemplary upconverting pigment particles include a mixture of Er and Yb based crystals that correspond to a green color, a mixture of Tm and Yb based crystals that correspond to a blue color and a mixture of Tm and Er based crystals that correspond to a red color. By way of example, the upconverting pigment particles can include one or more of ADA-3251, ADA-3252 or ADA-3253 from H. W. Sands of Jupiter, Fla.; LUUPC1, LUUPC2 or LUUPC3 of Luminochem of Budapest, Hungary; or 980 up-conversion phosphor from Fine Chemical Co., Ltd. of Weifang, China.

The upconverting pigment particles are present in the dispersion, preferably between 5% and 50% by weight, or between 20% and 40% by weight, or about 30% by weight. (When the term "about" is used herein, it refers to the corresponding value +/+5% of the corresponding value.)

The attachment of the dispersant to the outer surface of the upconverting pigment particles is an important feature in stabilizing the upconverting pigment particles within an aqueous solution. The use of specific dispersants, and the ratio of pigment particles to dispersant, surprisingly increases the stability of the pigment particles.

Preferably dispersants include one or more of acrylic polymers, alkali salts of sulphonated naphthalene formaldehyde condensates, lignin or lignin derivatives such as lignosulphonate, the reaction products with alkali sulfite and formaldehyde, or other block copolymers with pigment affinic groups, among others. Exemplary acrylic polymers include a polyacrylate, a polymethacrylate, a styrene-acrylate copolymer, a styrene-methacrylate copolymer, or a mixture thereof. By way of particular example, the dispersant can include one or more of Joncryl™ HPD 296 available from BASF Corp. of Wyandotte, Mich. or DisperBYK™ 190 available from BYK Chemie of Wesel, Germany. By way of example, the ratio of upconverting pigment particles to dispersant by weight in the upconverting pigment dispersion is between 1:1 and 10:1, or between 1:1 and 5:1, or between 2:1 and 4:1, or about 3:1.

A deformer may also be used. When used, the deformer aids in controlling the formation of the particles during milling. Preferably the deformer includes one or more siloxane-based deformers. By way of particular example, the deformer can include Surfynol™ available from Air Products and Chemicals, Inc. of Allentown, Pa. By way of example, the deformer may be present in the upconverting pigment dispersion from between 0% and 5% by weight, or between 0% and 1% by weight.

A solvent, or humectant, is an optional ingredient that may be used in the formation of the upconverting pigment dispersion and in the upconverting ink. The humectant may or may not be organic. The humectant reduces moisture loss of the upconverting pigment dispersion. It is used to adjust the viscosity of the upconverting pigment dispersion. Exemplary materials suitable for the humectant include one or more of Glycerol, 1,3-Propanediol or Triethylene glycol, among others. By way of example, the humectant may be present in the upconverting pigment dispersion from between 0% and 30% by weight, or between 5% and 25% by weight, or between 5% and 20% by weight Water may be included in the upconverting pigment dispersion and may be added later during formation of the upconverting ink. The water is preferably deionized, demineralized, or otherwise treated or filtered, in order to remove impurities.

Referring now to FIG. 1, a method 100 for forming an upconverting pigment dispersion is illustrated. The upconverting pigment particle(s), the dispersant(s), the optional humectant(s) and the water are pre-mixed as a first step 102. When mixed, the mixture is moved to a mill, such as a wet media mill. By way of example, an Eiger Mini Motormill, model MKII M250 from Engineered Mills, Inc. of Grayslake, Ill. may be used.

The mixture is milled until particle size of the mixture reaches a predetermined size. The mixture is milled from about 1 hour to about 8 hours. The final particle size can correspond to any measurement system such as an average particle size, a D90 particle size, or the like. The particle size may be periodically measured during the milling process, as desired, until the particle size of the mixture is at or below the predetermined size. Exemplary particle sizes suitable for use in the aqueous upconverting ink of the present invention include average particle sizes of 200 nanometers (nm) or less, 150 nm or less, 100 nm or less, 50 nm or less or between 50 nm and 150 nm.

Table 1 below illustrates four examples of upconverting pigment dispersions. Table 1 illustrates ingredients by a percentage of total weigh of the upconverting pigment dispersions.

TABLE 1

Upconversion Pigment Dispersion Examples

| Ingredient | Dispersion 1 | Dispersion 2 | Dispersion 3 | Dispersion 4 |
| --- | --- | --- | --- | --- |
| Upconversion pigment Powder | 30% | 30% | 30% | 30% |
| Dipsersant | Jponcryl HPD 296 | Joncryl HPD 296 | DisperseBYK 190 | DisperseBYK 190 |
| P/D Ratio | 3 | 3 | 3 | 3 |
| Deformer | <1% | <1% | <1% | <1% |
| Process | Media wet mill, 3 hours | Media wet mill, 8 hours | Media wet mill, 3 hours | Media wet mill, 8 hours |
| Final particle size (nm), ave./D90 | 185/365 | 124/297 | 202/420 | 152/355 |
| Stability (Zeta Potential, mV) | −54 | −62 | −41 | −52 |
| Particle size after aging (60 C., 8 Wks.) | 188/392 | 120/301 | 236/443 | 185/401 |
| Particle size after 1 year at ambient | NA | 116/253 | NA | NA |

For each of the dispersions, ADA-3252 was used as the upconverting pigment. It was pre-mixed with the dispersant, the deformer, an organic solvent and water. The mixture was then moved to an Eiger Mini Motormill Model MKII, M250 wet media mill. The mixture was milled until the average particle size reached or was below 150 nm. The particle size was measured every hour using a Malvern Nano-Z90 Zetasizer, available from Malvern Instruments, Inc. of Westborough, Mass. Water and the organic solvents were adjusted to achieve the desired viscosity of the mixture.

Each of the dispersions included 30% by weight of the upconverting pigment, ADA-3252, and the ratio of pigment to dispersant by weight was 3:1. The first two dispersions used Joncryl HPD 296 as the dispersant and the second two dispersions used DisperseBYK 190 as the dispersant. The deformer used in each of the dispersions was a siloxane-based deformer.

The stability of the dispersions was based on zeta potential, which was measured using the Malvern Nano-Z90 Zetasizer. Each of the dispersions was aged at 60 degrees Celcius (60° C.) for 8 weeks after which the particle size was again measured as another measure of stability. Aging the dispersions at 60° C. for 8 weeks simulates about two years of shelf life at ambient temperatures.

The results show high stability for these water-based upconverting pigment dispersions, both in terms of zeta potential and particle size. The particle size of each of the dispersions remained relatively stable after aging at 60° C. for 8 weeks. Also, the particle size of dispersion 2 remained relatively stable after aging for one year in a stable environment with ambient temperatures (none of the other dispersions have been aged for a year or more).

As can be seen by the foregoing examples, the milling process and the use of a dispersant caused each of the upconverting pigment mixtures to remain stable. In particular, the selection of dispersants and the specific ratio of pigment particles to dispersant by weight increased stability considerably.

Having formed stable aqueous upconverting pigment dispersions, the inventors were able to create stable aqueous upconverting inks. Upconverting inks based on the above upconverting pigment dispersions include one or more of the upconverting pigment dispersions, a colorant, a humectant, a penetrant, a surfactant, and water.

The preferred amount of upconverting pigment in the final inks were between 1% and 20% by weight or between 3% and 10% by weight, such as about 4% by weight, or about 6% by weight, or about 8% by weight of the final upconverting ink.

A colorant is an optional element of the upconverting ink. When used, the colorant is visible when illuminated by light having a wavelength that falls within the visible light spectrum (i.e., "normal" lighting). For example, the colorant may appear black, cyan, magenta, yellow or any combination thereof when illuminated by natural light. The colorant may also, or instead, include a fluorescent pigment that outputs light in the visible spectrum when illuminated by ultraviolet light. In that regard, the upconverting ink may have a visible and/or ultraviolet-responsive aspect due to the colorant and an upconverting aspect due to the upconverting pigment.

The colorant can include one or more pigments or dyes. The pigments can be organic and/or inorganic. Exemplary organic pigments include azo compounds, phthalocyanine pigments, quinacridone pigments, anthraquinone pigments, dioxazine pigments, indigo, thioindigo pigments, perynone pigments, perylene pigments, and isoindolene.

Exemplary inorganic pigments include titanium dioxide, iron oxide and metal complex. When used, the amount of colorant in the upconverting ink may be less than 10% by weight, between 0.5% and 10% by weight, or between 0.5% and 7% by weight of the final upconverting ink.

The colorant can be water-soluble or prepared as a colorant dispersion and added to the upconverting ink. The average particle size of dispersed colorants in an exemplary upconverting ink is between 50 nm and 200 nm. In some embodiments, it may be desirable for the particle size of the largest colorant particle to be no greater than 300 nm.

Humectants are used to prevent the fluids from drying or forming films on micro-fluid jetting device nozzle plates. Exemplary humectants include an alcohol, a glycol, a pyrrolidone, a diol or a mixture thereof.

By way of particular example, the humectant can include glycerol, ethylene glycol, 1,3 propanediol, 1,4 butanediol, 1,4 cyclohexanedimethanol, 1,5 pentanediol, 1,2-hexanediol, 1,6 hexanediol, 1,8 octanediol, 1,2 propanediol, 1,2 butanediol, 1,3 butanediol, 2,3 butanediol, diethylene glycol, triethylene glycol, tetraethylene glycol, polyethylene glycol with average molecular weight of 200, 300, 400, 600, 900, 1000, 1500 and 2000, dipropylene glycol, polypropylene glycol with average molecular weight of 425, 725, 1000, and 2000, 2-pyrrolidone, 1-methyl-2-pyrrolidone, 1-methyl-2-piperidone, N-ethylacetamide, N-methylpropionamide, N-acetyl ethanolamine, N-methylacetamide, formamide, 3-amino-1,2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, sorbital, pantothenol and Liponic EG-1. When used, the amount of humectant may be between 1% and 30% by weight, or between 5% and 25% by weight, or between 5% and 15% by weight, or between 0% and 10% by weight of the final upconverting ink.

Penetrants are another optional ingredient in the upconverting ink. When used, penetrants aid the upconverting ink in penetrating the surface of a substrate so that the ink can be absorbed into the substrate. Exemplary penetrants include 1, 2 C1-C6 alkyl diols such as 1,2 hexanediol, N-propanol, isopropanol and hexyl carbitol. When used, the amount of penetrant is between 0.1% and 10% by weight of the final upconverting ink.

Surfactants are another optional ingredient in the upconverting ink. When used, surfactants modify the surface tension and/or the viscosity of the upconverting ink and are used to adjust the jettability characteristics and the wetting characteristics of the ink. The final upconverting ink composition should include only the minimum amount of surfactants necessary for the ink to achieve reliable jetting. Surfactants having a low molecule weight and may attack the polymeric dispersants on the surface of the upconverting pigment particles causing instability of the dispersion. In order to achieve the characteristics desired for the inkjet ink composition, the amount of total surfactants in the upconverting ink is between 0% and 2% by weight, or between 0.01% and 2% by weight, or between 0.1% and 2% by weight of the final upconverting ink.

Exemplary surfactants are preferably non-ionic. By way of particular example, the surfactant can include fluorosurfactants, such as Capstone® surfactants, available from DuPont of Wilmington, Del., APFS® surfactants, available from Advanced Polymer, Inc. of Carlstadt, N.J., Chemguard®, available from Chemguard Inc. of Mansfield, Tex., Nevec, available from 3M of St. Paul, Minn.; alkylaryl polyether alcohol non-ionic surfactants, such as octylphenoxy-polyethoxyethanol, available from Dow Chemical Company of Midland, Mich. under the trade name TRI- TON®; alkylamine ethoxylates non-ionic surfactants, available from Dow Chemical Company of Midland, Mich. under the trade name TRITON® including TRITON® CF-10 and under the trade name TERGITOL®; ethoxylated acetylenic diol surfactants, available from Air Products and Chemicals, Inc. of Allentown, Pa. under the trade names SURFYNOL® and Dynol®; polysorbate products, available from ICI Chemicals & Polymers Ltd. of Middlesborough, UK under the trade name TWEEN®; polyalkylene and polyalkylene modified surfactants, available from Crompton OSI Specialties of Greenwich, Conn., under the trade name SILWET®; polydimethylsiloxane copolymers and surfactants, available from Momentive Performance Materials Inc. of Waterford, N.Y. under the trade name COATOSIL®; alcohol alkoxylates nonionic surfactants, available from Uniqema of New Castle, Del., under the trade names RENEX®, BRIJ®, and UKANIL®; sorbitan ester products, available from Omya Peralta GmbH of Hamburg, Germany under the trade names SPAN® and ARLACEL®; alkoxylated esters/polyethylene glycol surfactants, available from ICI Chemicals & Polymers Ltd. of Middlesborough, UK under the trade names TWEEN®, ATLAS®, MYRJ® and CIRRASOL®; alkyl phosphoric acid ester surfactant products such as amyl acid phosphate, available from Chemron Corporation of Paso Robles, Calif., under the trade name CHEMPHOS® TR-421; alkyl amine oxides, available from Chemron Corporation of Paso Robles, Calif. under the trade name CHEMOXIDE®; anionic sarcosinate surfactants, available from Hampshire Chemical Corporation of Nashua, N.H. under the trade name HAMPOSYL®; glycerol esters or polyglycol ester nonionic surfactants, available from Calgene Chemical Inc. of Skokie, Ill. under the trade name HODAG®, available from Henkei-Nopco A/S of Drammen, Norway under the trade name ALPHENATE®, available from Hoechst AG of Frankfurt, Germany under the trade name SOLEGAL® W, and available from Auschem SpA of Milan, Italy under the trade name EMULTEX®; polyethylene glycol ether surfactants, available from Takemoto Oil and Fact Co. Ltd. of Japan under the trade name NEWKALGEN®; modified poly-dimethyl-silicone surfactants, available from BYK Chemie of Wesel, Germany under the trade name BYK® 300; and other commercially available surfactants known to those skilled in the art.

The upconverting ink may also include other additives known in the art such as one or more chelating agents, buffers, biocides, fungicides, bactericides, anti-curling agents, anti-bleed agents, anti-kogation agents, surface tension modifiers or buffers. Exemplary biocides include benzisothiazolin-one, methyl-isothiazolin-one, chloro-methyl-isothiazolin-one, sodium dihydroacetate, sodium sorbate, sodium 2-pyridinethiol-1-oxide, sodium benzoate and sodium pentachlorophenol. By way of particular example, the biocide can include Zolidine™, available from The Dow Chemical Co. of Midland, Mich.; Proxel™, available from Lonza of Basel, Switzerland; Canguard™ 327, available from The Dow Chemical Co. of Midland, Mich.; and Kathon® PFM, available from The Dow Chemical Co. of Midland, Mich. It is preferred that the upconverting ink have a pH level between 6.5 and 8.5.

Figure 2:
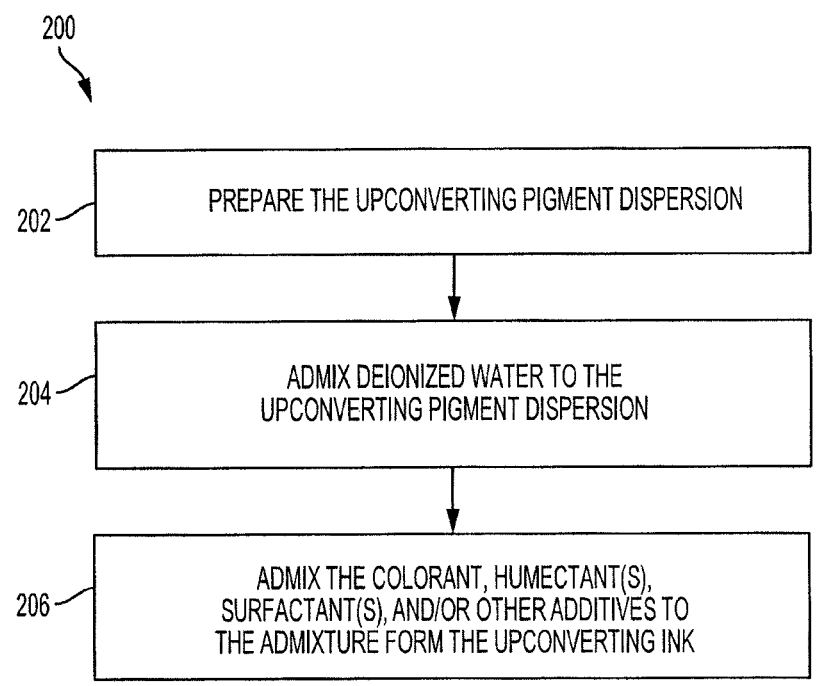
FIG. 2 is a block diagram illustrating a preferred method for making an upconverting ink.

Referring now to FIG. 2, a method 200 for preparing an upconverting ink is shown. The method 200 begins with preparing the upconverting pigment dispersion in step 202. The water is admixed to the upconverting pigment dispersion in step 204. Preferably, the water is admixed to the upconverting pigment dispersion for a period of time, such as between 3 and 20 minutes, before the humectant is admixed.

The colorant, humectant, surfactant and any additional ingredients are admixed to the admixture in step 206. Preferably, these ingredients are introduced one by one and mixed for a period of time before addition of another ingredient. For example, it may be desirable for each ingredient to be mixed for between 3 and 20 minutes, or between 5 and 15 minutes, prior to addition of the next ingredient. It is preferred for these ingredients to be admixed in the following order. First, the surfactant should be admixed, then the humectant, and then any optional colorants or other additives.

Table 2 below illustrates nine examples of upconverting ink formulations made by the inventors, each using one of the upconverting pigment dispersion examples of Table 1. Table 2 illustrates ingredients by a percentage of total weight of the final upconverting ink composition.

TABLE 2

| | Ink formulation examples | | | | | | | | |
|---|---|---|---|---|---|---|---|---|---|
| Ingredient | Ink 1 | Ink 2 | Ink 3 | Ink 4 | Ink 5 | Ink 6 | Ink 7 | Ink 8 | Ink 9 |
| Upconversion Pigment Dispersion | Disp. 2 | Disp. 2 | Disp. 2 | Disp. 4 | Disp. 4 | Disp. 4 | Disp. 2 | Disp. 2 | Disp. 2 |
| UP material % in ink | 4.0% | 6.0% | 8.0% | 4.0% | 6.0% | 8.0% | 8.0% | 8.0% | 8.0% |
| Other Colorants | None | Black Dye | Black pigment (composited) | None | Black Dye | Black pigment (composited) | Cyan pigment | Magenta pigment | Yellow pigment |
| Tergitol 15-S-7 | 0.7% | 0.7% | 0.7% | 0.7% | 0.7% | 0.7% | 0.7% | 0.7% | 0.7% |
| Glycerol | 6.0% | 6.0% | 6.0% | 6.0% | 0.0% | 0.0% | 0.0% | 0.0% | 0.0% |
| 1,3-Propanediol | 2.0% | 2.0% | 2.0% | 2.0% | 0.0% | 0.0% | 0.0% | 0.0% | 0.0% |
| Triethylene glycol | 2.0% | 2.0% | 2.0% | 2.0% | 0.0% | 0.0% | 0.0% | 0.0% | 0.0% |
| Biocide | 0.2% | 0.2% | 0.2% | 0.2% | 0.2% | 0.2% | 0.2% | 0.2% | 0.2% |
| D. I Water | Balanced | Balanced | Balanced | Balanced | Balanced | Balanced | Balanced | Balanced | Balanced |

The above infrared-to-visible upconverting inks were evaluated using an Epson WF-3520 printer, available from Epson America, Inc. of Long Beach, Calif. The inks were printed on Hammermill® Tidal® ColorLok paper, available from International Paper of Memphis, Tenn. The upconversion of light, corresponding to luminescence, was excited using a 5 milliwatt infrared laser pointer that emits light having a peak wavelength of about 980 nm (which is in the infrared spectrum). Table 3 below shows test results of each of the upconverting inks of Table 2.

TABLE 3

| | Ink 1 | Ink 2 | Ink 3 | Ink 4 | Ink 5 | Ink 6 | Ink 7 | Ink 8 | Ink 9 |
|---|---|---|---|---|---|---|---|---|---|
| Print quality | Good | Good | Good | Good | Good | Good | Good | Good | Good |
| Green Emission Strength | Strong | Strong | Strong | Strong | Medium | Medium | Strong | Strong | Strong |

As shown in Table 3, each of the inks exhibited good print quality when printed using the Epson WF-3520 printer onto the Hammermill® Tidal® ColorLok paper. Each of the first four inks and the last three inks produced strong luminescence when excited by the laser pointer. The fifth and sixth ink produced a medium amount of luminescence when excited by the laser pointer. The upconverting inks of the present invention produce strong luminescence regardless of whether colorant is added and regardless of what colorant is used.

What is claimed is:

1. A method of making an upconverting inkjet ink comprising:
    mixing $\beta$-$NaYF_4$ crystals doped with at least one of Erbium, Ytterbium or Thulium with a polymer dispersant that includes at least one of a polyacrylate, a polymethacrylate, a styrene-acrylate copolymer, or a styrene-methacrylate copolymer at a ratio of crystals to dispersant of 1:1 to 10:1, and water;
    milling the mixture of crystals, dispersant and water until the crystal particle sizes are between 50 nanometers and 200 nanometers;
    admixing deionized water at 60% to 96% by weight of the inkjet ink to the milled mixture.

2. The method of claim 1 further comprising: 3 minutes to 20 minutes after admixing the deionized water, admixing a surfactant at 0.01% to 2% by weight of the inkjet ink.

3. The method of claim 2 further comprising: 3 minutes to 20 minutes after admixing the surfactant, admixing a humectant at 1% to 20% by weight of the inkjet ink.

4. The method of claim 3 further comprising: 3 minutes to 20 minutes after admixing the humectant, admixing a colorant at 0.5% to 10% by weight of the inkjet ink.

* * * * *